(12) United States Patent
Atsumi et al.

(10) Patent No.: US 8,478,810 B2
(45) Date of Patent: Jul. 2, 2013

(54) MESSAGE HUB APPARATUS, PROGRAM PRODUCT, AND METHOD

(75) Inventors: Izumi Atsumi, Tokyo (JP); Hiroyuki Ogura, Yokohama (JP); Keiichi Tsuda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/962,844

(22) Filed: Dec. 21, 2007

(65) Prior Publication Data

US 2008/0155043 A1    Jun. 26, 2008

(30) Foreign Application Priority Data

Dec. 22, 2006    (JP) .................................. 2006-345919

(51) Int. Cl.
*G06F 15/16*    (2006.01)
*G06F 15/173*    (2006.01)

(52) U.S. Cl.
USPC ........................... 709/201; 709/218; 709/223

(58) Field of Classification Search
None
See application file for complete search history.

(56) References Cited

U.S. PATENT DOCUMENTS

| | | | |
|---|---|---|---|
| 7,529,683 B2 * | 5/2009 | Horvitz et al. ................. | 705/1.1 |
| 7,706,895 B2 * | 4/2010 | Callaghan ....................... | 700/17 |
| 2002/0049708 A1 * | 4/2002 | Moneymaker et al. ........... | 707/1 |
| 2006/0176812 A1 * | 8/2006 | Hatakeyama .................. | 370/229 |
| 2006/0277550 A1 * | 12/2006 | Williams et al. .............. | 718/107 |
| 2008/0120129 A1 * | 5/2008 | Seubert et al. ................... | 705/1 |

FOREIGN PATENT DOCUMENTS

| | | |
|---|---|---|
| JP | 7239756 | 9/1995 |
| JP | 9198347 A | 7/1997 |
| JP | 10063539 A | 3/1998 |
| JP | 10138611 A | 5/1998 |
| JP | 11167512 | 6/1999 |
| JP | 2001-160014 | 6/2001 |
| JP | 2001160014 A | 6/2001 |
| JP | 2002229943 A | 8/2002 |
| JP | 2004005204 A | 1/2004 |
| JP | 2006209165 A | 8/2006 |
| JP | 2006338206 | 12/2006 |

* cited by examiner

*Primary Examiner* — Thu Nguyen
*Assistant Examiner* — Angela Widhalm
(74) *Attorney, Agent, or Firm* — Patents on Demand, P.A.; Brian K. Buchheit; Scott M. Garrett

(57) ABSTRACT

There is provided a message hub apparatus for efficiently processing service processing messages in an enterprise system. The message hub apparatus stores a value of minimum residence time as minimum time during which the service processing message is to reside in a message queue. The message present in the message queue is transmitted to a service provider on condition that the minimum residence time has elapsed. The apparatus performs a merge processing of the received service processing message and the service processing message which resides in the queue. A history of the merge processing stored in the apparatus is analyzed, and the value of the minimum residence time is modified based on an analysis result.

20 Claims, 7 Drawing Sheets

| MERGE PROCESSING ID | SERVICE ID | SEARCH CONDITION | CONTENT OF MERGE PROCESSING |
|---|---|---|---|
| M0001 (CANCELLATION) | S0005 | IDENTICAL Cust ID AND IDENTICAL Order Number UNDER THE CONDITION THAT Number = "Cancel" | ONLY DELETE MESSAGE FROM QUEUE |
| M0002 (ADDITION) | S0005 | IDENTICAL Cust ID AND IDENTICAL Product ID | ADD Number |
| ⋮ | ⋮ | ⋮ | ⋮ |

```
<message serviceID="S0005">
    <orderNumber value="ON0001"/>
    <custID value="custA"/>
    <productID value="productX"/>
    <Number value="10">
</message>
```

```
<message serviceID="S0005">
    <orderNumber value="ON0002"/>
    <custID value="custA"/>
    <productID value="productX"/>
    <Number value="20">
</message>
```

```
<message serviceID="S0005">
    <orderNumber value="ON0001"/>
    <custID value="custA"/>
    <productID value="productX"/>
    <Number value="cancel">
</message>
```

MESSAGE HUB APPARATUS, PROGRAM PRODUCT, AND METHOD

BACKGROUND OF THE INVENTION

The present invention, in general, relates to the information processing technology, and more particularly, relates to a message hub apparatus, a program, and a method for efficiently processing service processing messages.

Recently, SOA (service oriented architecture) has rapidly spread as a design technique of an information system, which causes a plurality of services to cooperate with each other using integration technology of an industry standard. According to the SOA, after extracting service units, for example, "inventory management", "credit processing", and "delivery processing", from a business process, it can flexibly constitute an enterprise system which encompasses the whole business process, such as a "sales management system", an "order receiving system", and a "production management system", by causing the service units to cooperate with each other.

A typical example of an implementation form of the enterprise system according to such SOA can include the form in which a hub layer is provided between a process service layer for managing the whole business process and a service layer for actually providing the respective extracted services.

A message hub apparatus provided in the hub layer receives service processing messages (for example, requests for invoking or canceling service processings) from a service requester arranged in the process service layer, arranges the messages in a message queue, and then transfers the messages to a service provider arranged in the service layer. The service provider then processes the transferred messages and returns the processing results to the service requester.

Since the increase in the service processing amount in the service provider leads to the increase in required computer resources, it is preferred for the service provider that the service processing amount is reduced in order to reduce investment for the computer resources. It is also preferred for the service requester that the service processing amount is reduced in order to reduce charge from the service provider. Accordingly, it is understood that it is useful to optimize the service processing messages stored in the message queue in the message hub apparatus so that the processing amount in the service provider is reduced.

In addition, as the background art relevant to the queuing technique, Japanese Unexamined Patent Publication (Kokai) No. 2001-160014 discloses a queuing method for reducing data to be registered in a queue by, when certain data is to be registered in the queue, searching whether or not the data mergeable with the certain data has been registered in the queue, and, if the data mergeable with the data to be registered in the queue by a program for performing data transmission has already been registered in the queue, merging the data with each other.

SUMMARY OF THE INVENTION

In the queuing method disclosed in Japanese Unexamined Patent Publication (Kokai) No. 2001-160014, it is not considered at all as to time for data having registered in a queue, but the data to be registered in the queue is merely merged with the data which happens to be registered in the queue at the time. Hence, it is understood that the data which should have been merged may be processed without being merged, resulting in efficient merge processing being interrupted.

Therefore, an object of the present invention is to provide a message hub apparatus, a program, and a method for more efficiently performing the merge processing of a service processing message, provided with characteristics that are absent in the background art, which are novel, and that cannot be readily conceived by a person skilled in the art.

In order to achieve the objects mentioned above, there is provided a message hub apparatus which receives service processing messages from a service requester and transmits them to a service provider. The message hub apparatus includes, a message storage unit for storing the service processing messages received from the service requester, a timer for measuring time for each service processing message having resided in the message storage unit; a first storage unit for storing a value of minimum residence time as minimum time during which the service processing message is to reside in the message storage unit; and a message transmission unit for transmitting the service processing message present in the message storage unit to the service provider that should process the service processing message under the condition that the minimum residence time has elapsed.

In addition to the respective elements mentioned above, the message hub apparatus further includes: a search unit for searching a service processing message present in the message storage unit, which is mergeable with the received service processing message, in response to the service processing message being received from the service requester; a message merge unit for performing a merge processing of the received service processing message and the mergeable service processing message, on condition that the mergeable service processing message has been searched; a second storage unit for storing a history of the merge processing of the messages by the message merge unit; and a control unit for determining an optimum value of the minimum residence time by analyzing the history of the merge processing stored in the second storage unit, and for modifying the value of the minimum residence time stored in the first storage unit to the determined optimum value.

As described above, white the summary of the present invention has been described as the message hub apparatus, the present invention can also be grasped as a method, a program, or a program product thereof. The program product includes, for example, a storage medium with the above-described program stored therein or can include a medium for transmitting the program.

It should be noted that the schematic description above of the present invention does not recite alt the essential features of the present invention, and that combinations or sub-combinations of these components can also constitute the present invention.

BRIEF DESCRIPTION OF THE DRAWINGS

FIG. 6 is an example of a service processing message according to the embodiment of the present invention;

DETAILED DESCRIPTION OF THE INVENTION

Although the best modes for carrying out the present invention will be described in detail hereinafter based on the figures, the embodiments below are not intended to limit the invention according to the claims, and all the combinations of features described in the embodiments are not necessarily essential to the means for solving the problems.

In addition, the present invention can be carried out in a variety of different aspects, and thus it should not be construed as limited to those described in the embodiments. Moreover, it should be noted that all the combinations of the features described in the embodiments are not necessarily essential to the means for solving the problems. Similar elements are given similar reference numbers throughout the description of the embodiments.

Figure 1:
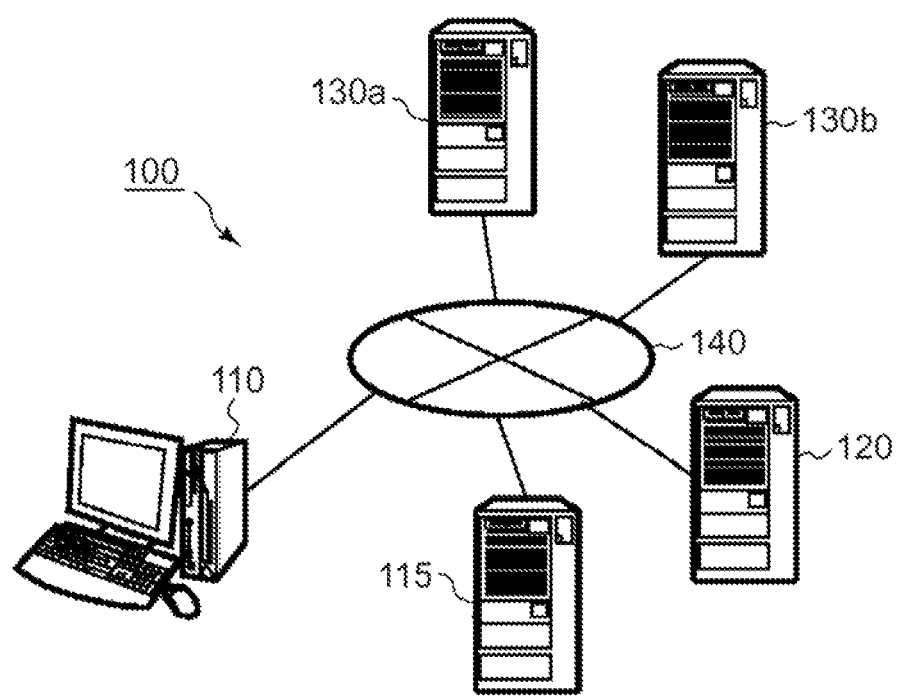
FIG. 1 is a high-level schematic view of a general representation of a system according to an embodiment of the present invention.

FIG. 1 is a high-level schematic view illustrating a general representation of an enterprise system 100 according to an embodiment of the present invention. The enterprise system 100 of the embodiment of the present invention includes a client 110, a service requester 115, a message hub apparatus 120, and a plurality of service providers 130a and 130b (which may be simply referred to as the "service provider 130" hereinbelow), each of which being connected with each other via a communication network 140.

The client 110 is a computer apparatus for carrying out a business process by a user of the enterprise system 100 to interact with the service requester 115 which manages the whole business process. Although the client 110 interact with the service requester 115 via a well-known web browser, such a technique has been well known and can be suitably performed by a person skilled in the art, so that the technique will not be described herein in detail for simplicity of description.

The service requester 115 of the embodiment of the present invention is the computer apparatus arranged in a process service layer for managing the whole business process, which can transmit a massage related to each service processing provided by the service provider 130 (hereinbelow, referred to as the "service processing message") to the message hub apparatus 120 in accordance with the need to perform the business process. The service processing message in the embodiment of the present invention includes, but not limited to, a request for invoking the service processing, a request for canceling the service processing, or the like.

The message hub apparatus 120 of the embodiment of the present invention is a computer apparatus arranged in a hub layer, provided with a message queue which temporarily stores the service processing messages received from the service requester 115 until it is transferred to the service provider 130 via the network 140.

In the message hub apparatus 120 of the embodiment of the present invention, minimum residence time is set up, which is minimum time during which the service processing message is to reside in the message queue. Namely, the service processing message in the message queue resides in the message hub apparatus 120 for at least the minimum residence time, and it is transferred to the service provider 130 via the network 140, on condition that the minimum residence time has elapsed.

The message hub apparatus 120 of the embodiment of the present invention also has a function, when the message hub apparatus receives the service processing message mergeable with the service processing message while it resides in the message queue, to optimize the service processing message by merging the service processing message residing in the message queue and the received service processing message.

In addition, the message hub apparatus 120 of the embodiment of the present invention has a function to actually store an executing condition of a merge processing of the service processing messages and optimize setting of the minimum residence time based on this stored executing condition. This optimization function will be described later in detail.

The service provider 130 of the embodiment of the present invention is a computer apparatus arranged in the service layer for actually providing each service. Specifically, the service provider 130 has a function to process the service processing message transferred from the message hub apparatus 120 via the network 140 and return a processing result to the service requester 115 via the message hub apparatus 120

It is regarded that the service provider 130 also has a function to perform a charge processing on the service processings performed for the service requester 115. However, the charge processing itself can be appropriately implemented by a person having ordinary skill in the art based on various charge policies, and the detailed description thereof will not be given here.

The communication network 140 of the embodiment of the present invention can be implemented by Internet, for example. Internet connects between the systems using the well-known TCP/IP. On the internet, the systems to communicate mutually are specified by an IP address represented by a global address or a local address. In the embodiment of the present invention, it is regarded that the network connection between the respective computer apparatuses is realized using a VPN (Virtual Private Network) technology well known in the field of Internet technology for the purpose of security.

Figure 2:
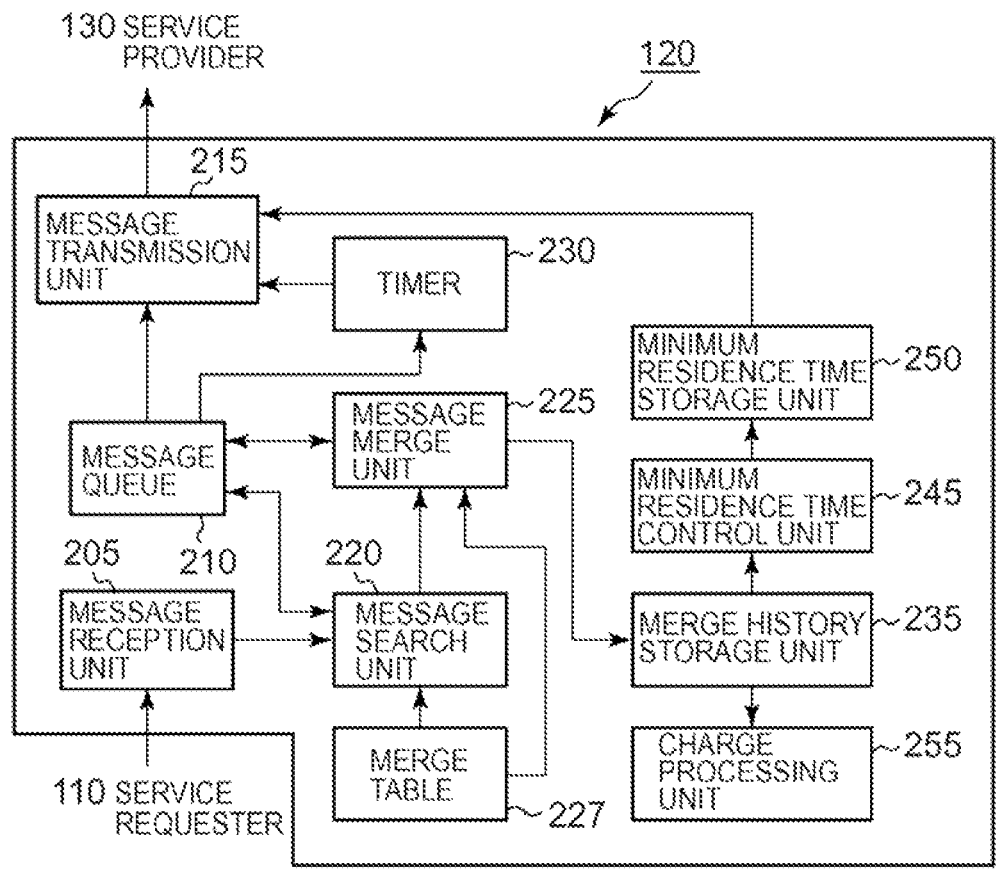
FIG. 2 is a functional block diagram of a message hub according to the embodiment of the present invention.

FIG. 2 is a functional block diagram of the message hub apparatus according to the embodiment of the present invention. Incidentally, each element shown in the functional block diagram of FIG. 2 can be realized, in an information processing apparatus having a hardware configuration illustrated in FIG. 9, by causing an operating system or a computer program stored in a hard disk drive 13 to be loaded to a main memory 4 and then read into a CPU 1, and by causing hardware resource and software to cooperate with each other.

The message hub apparatus 120 of the embodiment of the present invention is provided with a message reception unit 205, a message queue 210, a message transmission unit 215, a message search unit 220, a message merge unit 225, a merge table 227, a timer 230, a merge history storage unit 235, a minimum residence time control unit 245, a minimum residence time storage unit 250, and a charge processing unit 255.

The message reception unit 205 can receive the service processing message transmitted from the service requester 115 via the network 140. The message reception unit 205 notifies content of the service processing message to the message search unit 220, in response to reception of the service processing message.

The message queue 210 has a queue structure which stores the service processing messages received by the message reception unit 205 and sequentially sends out the service processing messages following the storage order. According to the embodiment of the present invention, it is regarded that the service processing message, even if it is present at the head of the message queue 210, continues to reside in the message queue, until minimum residence time stored in the minimum residence time storage unit 250 as minimum time during which the service processing message is to reside in the message queue has elapsed.

The message transmission unit 215 has a function to transmit the service processing message in the message queue 210 to the service provider that should process the service processing message. More specifically, the message transmission unit 215 receives the residence time measured by the timer 230 for each service processing message in the message queue 210, and transmits the service processing message, on condition that the minimum residence time has elapsed.

The message search unit 220 has a function to search whether or not a service processing message, which is mergeable with the received service processing message, is present in the message queue 210 in accordance with a merge processing rule stored in the merge table 227, in response to reception of notification of message content from the message reception unit 205 which has received the service processing message.

The message merge unit 225 performs the merge processing of the received service processing message and the searched service processing message in accordance with the merge processing rule stored in the merge table 227, on condition that the mergeable service processing message has been searched by the message search unit 220, and creates a new service processing message.

In the embodiment of the present invention, it is regarded that this new service processing message is arranged in the tail of the message queue 210. Note herein that if the mergeable service processing message has not been searched by the message search unit 220, the message merge unit 225 arranges the received service processing message itself in the tail of the message queue 210. The message merge unit 225 also has a function to delete the merged message in the message queue 210 from the message queue 210.

Figures 4, 5:
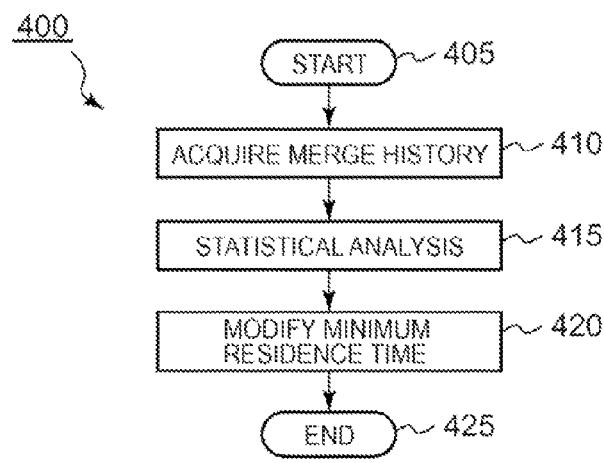
FIG. 4 is a flow chart representing modification processing of a value of minimum residence time in the enterprise system according to the embodiment of the present invention.
FIG. 5 is an example of a merge table 227 according to the embodiment of the present invention.

The merge table 227 stores the merge processing rule of a plurality of service processing messages which are referred to by the message search unit 220 and the message merge unit 225. FIG. 5 shows an example of the merge table 227 according to the embodiment of the present invention.

The merge table 227 illustrated in FIG. 5 includes a merge processing ID 510 for indicating a type of the merge processing: a service ID 520 for indicating a type of the service, a search key item 530, and content of merge processing 540. Specifically, the embodiment of the present invention defines cancellation 550 (merge processing ID: M0001) and addition 560 (merge processing ID, M0002).

The content of the merge processing "cancellation 550" of the embodiment of the present invention is such that when the service processing message for the service having the service ID "S0005" is received, and on condition that a value of the number of order (Number) in the received message is "Cancel", it searches the message in the message queue 210 having an order number (orderNumber) and a customer ID (custID) identical with those of the received message, and deletes the searched message from the queue.

The content of the merge processing "addition 560" of the embodiment of the present invention is such that when the service processing message for the service having the service ID "S0005" is received, it searches the message in the message queue 210 having the customer ID (custID) and a product number (productID) identical with those of the received message, creates the message having the added number of orders (Number) of the received message and the searched message, and arrange the message in the queue.

The timer 230 has a function to measure the residence time in the message queue 210 of each service processing message stored in the message queue 210. In the embodiment of the present invention, the measured residence time of the service processing message is used for the message transmission unit 215 to determine whether or not the message can be transmitted to the service provider 130. The measured residence time of the service processing message is also used for the message search unit 220 to determine whether or not the service processing message in the message queue is mergeable.

The merge history storage unit 235 stores a history of the merge process including the executing condition of the merge processing of the service processing message performed by the message merge unit 225. The executing condition of the merge processing includes the time during which each service processing message has resided in the message queue 210 until it is at least sent to the service provider or merged with another service processing message. This stored history of the merge processing is used for the minimum residence time control unit to determine an optimum value of the minimum residence time.

The minimum residence time control unit 245 analyzes the executing condition or the like of the merge processing stored in the merge history storage unit 235, in order to determine the optimum value of the minimum residence time. In the embodiment of the present invention, the minimum residence time control unit statistically analyzes the residence time of each service processing message in the message queue 210 at a given time interval (for example, once in a week) to determine the value of the minimum residence time for performing the merge processing most efficiently. The minimum residence time control unit 245 also has a function to modify the value of the minimum residence time stored in the minimum residence time storage unit 250 to the determined optimum value of the minimum residence time.

The minimum residence time storage unit 250 stores a value of the minimum residence time as the minimum time during which the service processing message is to reside in the message queue 210. As described above, the message transmission unit 215 transmits the service processing message stored in the message queue 210 to the service provider 130 based on this value of the minimum residence time.

The charge processing unit 255 has a charge logic similar to that of the service provider 130. The charge processing unit 255 calculates charge for the service processing message actually transmitted to the service provider 130 by the message transmission unit 215 in accordance with this charge logic. The charge processing unit 255 also calculates the charge for the service processing message which should have been transmitted to the service provider 130 if the merge processing has not been performed, based on the history of the merge processing stored in the merge history storage unit 235.

The charge processing unit 255 further has a function to calculate a difference between the charge for the actually transmitted message and the charge for the message which should have been transmitted if the merge processing has not been performed, and to notify it to the service requester 115 by means of electronic means, such as an E-mail, for example. It is understood that, in this manner, the service requester 115 is allowed to recognize how much the charge has been saved by the message hub apparatus 120.

The charge processing unit 225 also has a function to calculate the difference between a required amount of a computer resource for the service processing message received from the service requester and a required amount of the computer resource for the service processing message transmitted to the service provider, and to notify it to the service provider 130 by means of the electronic means, such as the E-mail, for example. It is understood that, in this manner, the service provider 130 is allowed to recognize how much the required amount of the computer resource has been saved by the message hub apparatus 120.

Note herein that, in the embodiment of the present invention the steps of calculating and notifying the charge described above are performed at a given time interval (for example, once in a month).

Figure 3:
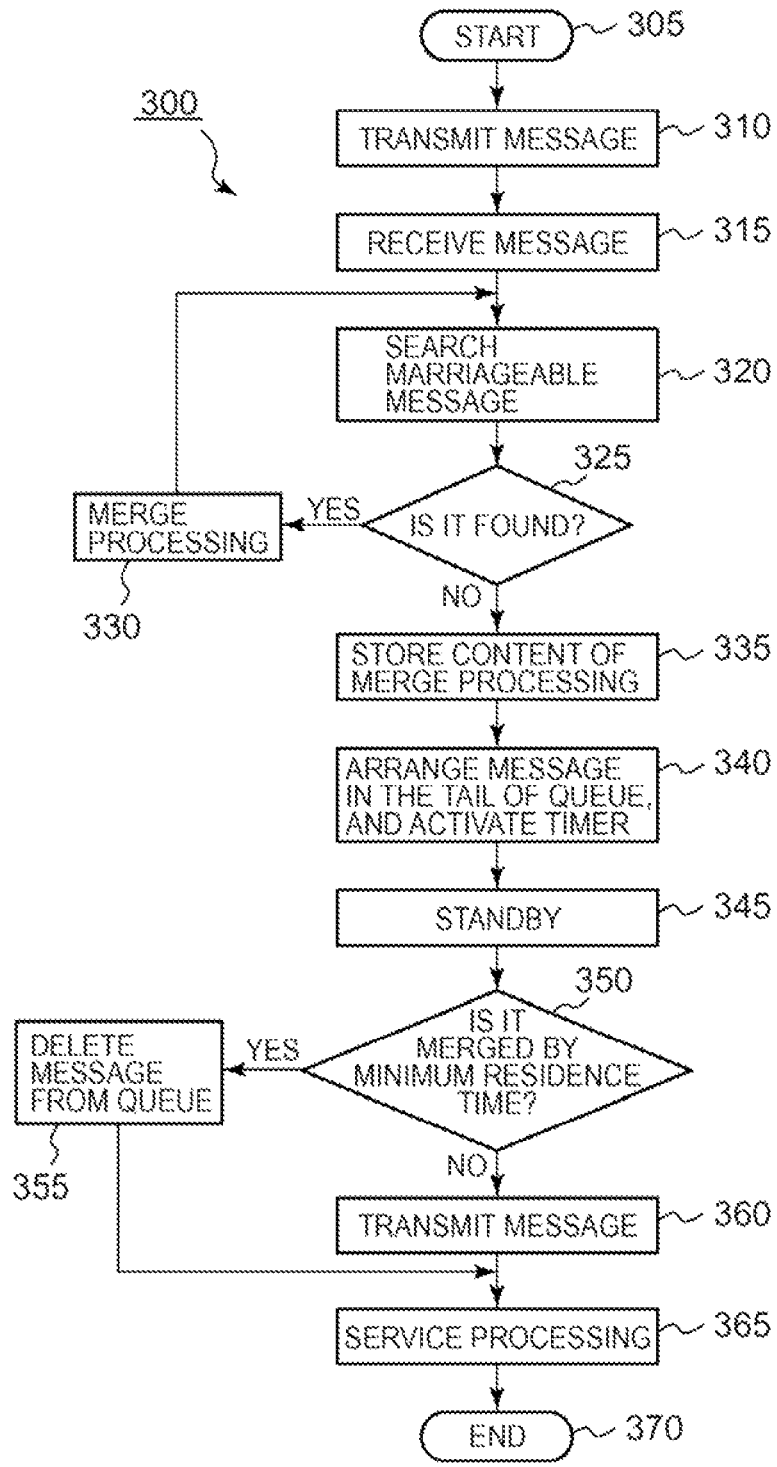
FIG. 3 is a flow chart representing processing of a service processing message in an enterprise system according to the embodiment of the present invention.

FIG. 3 is a flow chart representing the operation, in the enterprise system 100 of the embodiment of the present invention, in which a certain service processing message transmitted from the service requester 115 is processed. The process is started from Step 305, and then the service requester 115 transmits the service processing message for the network 140 at Step 310 in order to receive the service required for carrying out the business process.

The process proceeds to Step 315, at which the message reception unit 205 of the message hub apparatus 120 receives the service processing message from the network 140, which has been transmitted from the service requester 115 at Step 305.

Next, at Step 320, in response to reception of the message at Step 315, the message search unit 220 searches the message in the message queue 210 to find the message mergeable with the received message in accordance with a predetermined merge processing rule in the merge table 227.

The process proceeds to Step 325, at which it is determined whether or not the mergeable message is present. If it is determined that the mergeable message is present at Step 325, the process proceeds to Step 330 through a YES arrow.

At Step 330, the merge processing unit 225 merges the service processing message received by the message reception unit 205 and the service processing message which has been determined to be mergeable at Step 325 in accordance with the predetermined merge processing rule in the merge table 227. Incidentally, the merged service processing message in the message queue 210 is deleted from the queue at this time.

The determination and merge processing at Steps 325 through 330 will specifically be described using a specific example of the service processing message illustrated in FIG. 6. First, assume that, at a certain point of the embodiment of the present invention, a first service processing message 610 for requesting a materials order processing service "0005" is stored in the message queue 210. Specifically, it is regarded that the first service processing message 610 means to make an order of a product X defined by the order number (orderNumber) of "ON0001" the customer ID (custID) of "custA", the product number (productID) of "productX", and the number of orders (Number) of 10.

Next, assume that a second service processing message 620 is received while the first service processing message 610 is stored in the message queue 210. Note herein that the second service processing message 620 means to make an order of the product X defined by the order number (orderNumber) of "ON0002" the customer ID (custID) of "custA", the product number (productID) of "productX", and the number of orders (Number) of 20.

In this case, since the first and second messages 610 and 620 have the identical custID and productID, the merge processing "M0002 (addition)" defined by the merge table 227 shown in FIG. 5 is applied. As a result, the service processing message is created with the added value of both Number values.

As another example, assume that a third service processing message 630 is received while the first service processing message 610 is stored in the message queue 210. Incidentally, the third service processing message 630 is defined by the order number (orderNumber) of "ON0001", the customer ID (custID) of "custA", the product number (productID) of "productX", and the number of orders (Number) of "cancel", and is intended to cancel the previous order.

In this case, since the first and third messages 610 and 630 have identical custID and orderNumber, the merge processing "M0001 (cancellation)" defined by the merge table 227 shown in FIG. 5 is applied. As a result, the service processing messages 610 and 630 are deleted.

Next, the flow chart 300 will be described again, where the process returns to Step 320. At Step 320, the message search unit 220 searches whether or not the message mergeable with the new message created as a result of the merge processing at Step 325 is present in the message queue 210, in accordance with the predetermined merge processing rule. The process then proceeds to Step 325 again.

Next, if it is determined that the mergeable message is present at second Step 325, the process proceeds to Step 330 through the YES arrow, and the similar process is performed at Step 325. This series of process is repeated until it is determined that the mergeable message is not present.

If it is determined that the mergeable message is not present at Step 325, the process proceeds to Step 335 through the NO arrow. At Step 335, if the merge process has been performed at Step 330, the condition thereof is stored in the merge processing history storage unit 235. Incidentally, if the merge processing has not been performed at all, nothing is newly stored in the merge processing history storage unit 235 at Step 335.

Next, at Step 340, the message merge unit 225 arranges the received service processing message (or the message merged with the received service processing message if the merge processing has been performed) in the tail of the message queue 210. In addition, at Step 340, it is regarded that the timer 230 initiates measurement of the residence time of the message arranged in the tail of the message queue 210. Then, at Step 345, it stands by for the residence time of the service processing message exceeding the minimum residence time stored in the minimum residence time storage unit 250.

The process further proceeds to Step 350, at which it is determined whether or not the service processing message arranged in the message queue 210 at Step 335 has been merged with the service processing message received afterward by the message reception unit 205 before the minimum residence time has elapsed.

If it is determined that it has been merged at Step 350, the process proceeds to Step 355 through the YES arrow. At Step 355, the merged service processing message is deleted from the message queue 210, and the process is ended at Step 370.

If it is determined that it has not been merged at Step 350, the process proceeds to Step 360 through a NO arrow. At Step 360, the message transmission unit 215 transmits the service processing message in the message queue 210 for which the minimum residence time has elapsed to the service provider 130 which is to process the service processing message, under the condition that other given conditions are satisfied.

Next, at Step 365, the service provider 130 which has received the service processing message performs the service processing in accordance with the service processing message, and returns the processing result to the service requester 115 via the message hub apparatus 120. Note herein that the service provider 130 performs charge calculation processing at this time. The process is then ended at Step 370.

FIG. 4 is a flow chart 400 representing a modification processing of the value of the minimum residence time stored in the minimum residence time storage unit 250 in the system of the embodiment of the present invention. Note herein that, in the embodiment of the present invention, the modification processing in the flow chart 400 is performed at a given time interval (for example, once in a week) asynchronously with the processing of the service processing message in the flow chart 300 shown in FIG. 3.

The process is started at Step 405, and then, at Step 410, the minimum residence time control unit 245 acquires information of the executing condition of the merge processing regarding a plurality of merge processings stored in the merge history storage unit 235. Note herein that, in the embodiment of the present invention, this information of the executing condition is stored in the merge history storage unit 235 at Step 335 in the flow chart 300 shown in FIG. 3.

Figure 7:
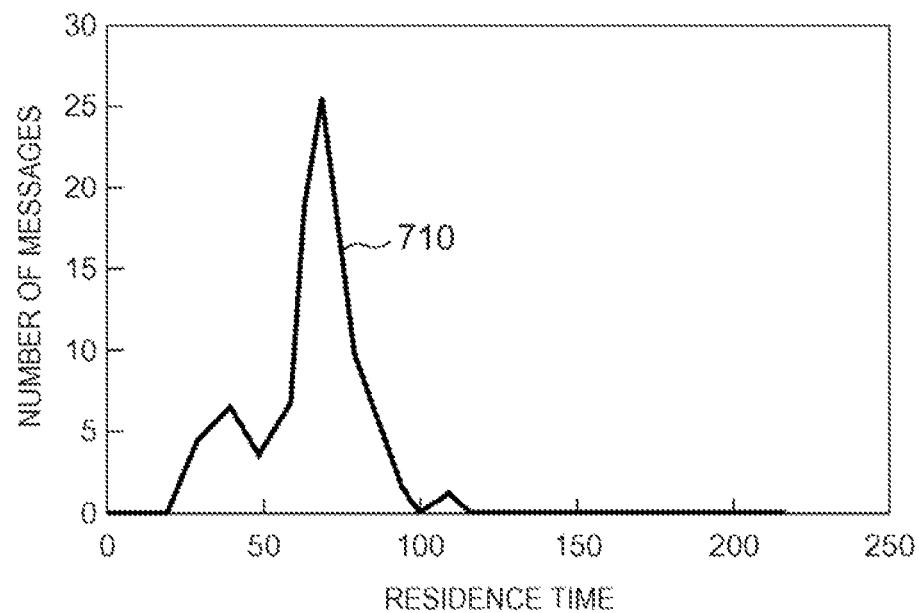
FIG. 7 is a graph representing an example of distribution of the residence time of the service processing message according to the embodiment of the present invention.

An example of the information of the executing condition of the merge processing acquired by the minimum residence time control unit 245 at Step 410 will be described using FIG. 7. The polygonal line 710 in FIG. 7 represents an example of a distribution of residence time t of the service processing messages as the information of the executing condition of the merge processing according to the embodiment of the present invention. At Step 410, the minimum residence time control unit 245 acquires the information equivalent to that illustrated in this graph as electronic data.

Next, the process proceeds to Step 415, at which the minimum residence time control unit 245 performs statistical analysis using the information of the executing condition of the merge processing acquired at Step 410. As a result a value of the optimum minimum residence time is determined at the time of analysis.

Figure 8:
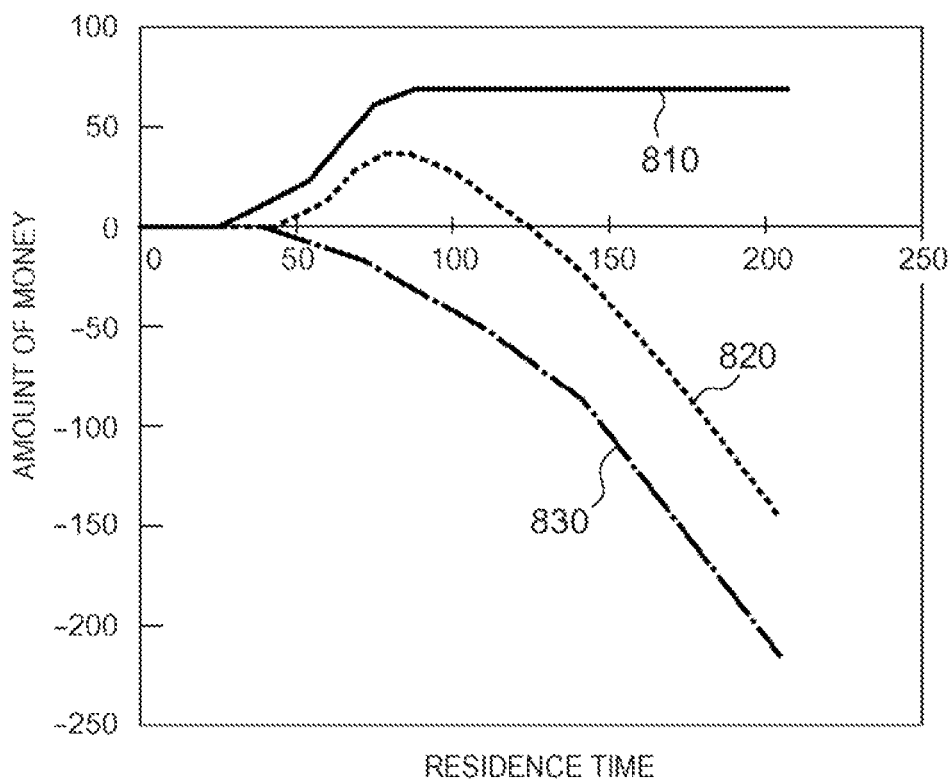
FIG. 8 is a graph representing an example of statistical analysis according to the present invention.

An example of the statistical analysis at Step 415 will be described in further detail using FIG. 8. FIG. 8 is a graph representing an example of the statistical analysis according to the embodiment of the present invention.

In the embodiment of the present invention, the minimum residence time control unit 245 calculates an amount of money S(t) saved by the merge processing, represented by the polygonal line 810 in the graph, from the information of the residence time t of each service processing message illustrated in FIG. 7, using the charge logic of the charge processing unit 255.

The minimum residence time control unit 245 also calculates a cost K(t) according to the residence time, represented by the polygonal line 830 in the graph, from the information of the residence time t of each service processing message illustrated in FIG. 7, using the charge logic of the charge processing unit 255. Incidentally, inventory cost increases as the residence time increases in the case of shipment, for example, and a negative absolute value of K(t) generally increases as the residence time t increases.

The minimum residence time control unit 245 then determines the residence time t, which is the maximum of S(t)+K(t) represented by the polygonal line 820 in the graph, as the optimum value of the minimum residence time, and modifies the minimum residence time stored in the minimum residence time storage unit.

Referring again to FIG. 4, the process further proceeds to Step 420, at which the minimum residence time control unit 245 modifies the value of the minimum residence time stored in the minimum residence time storage unit 250 to the new value determined at Step 415. In this manner, the processing of the service processing message shown in FIG. 3 is performed using the updated minimum residence time since then. Then, the process proceeds to Step 425 and is ended.

Figure 9:
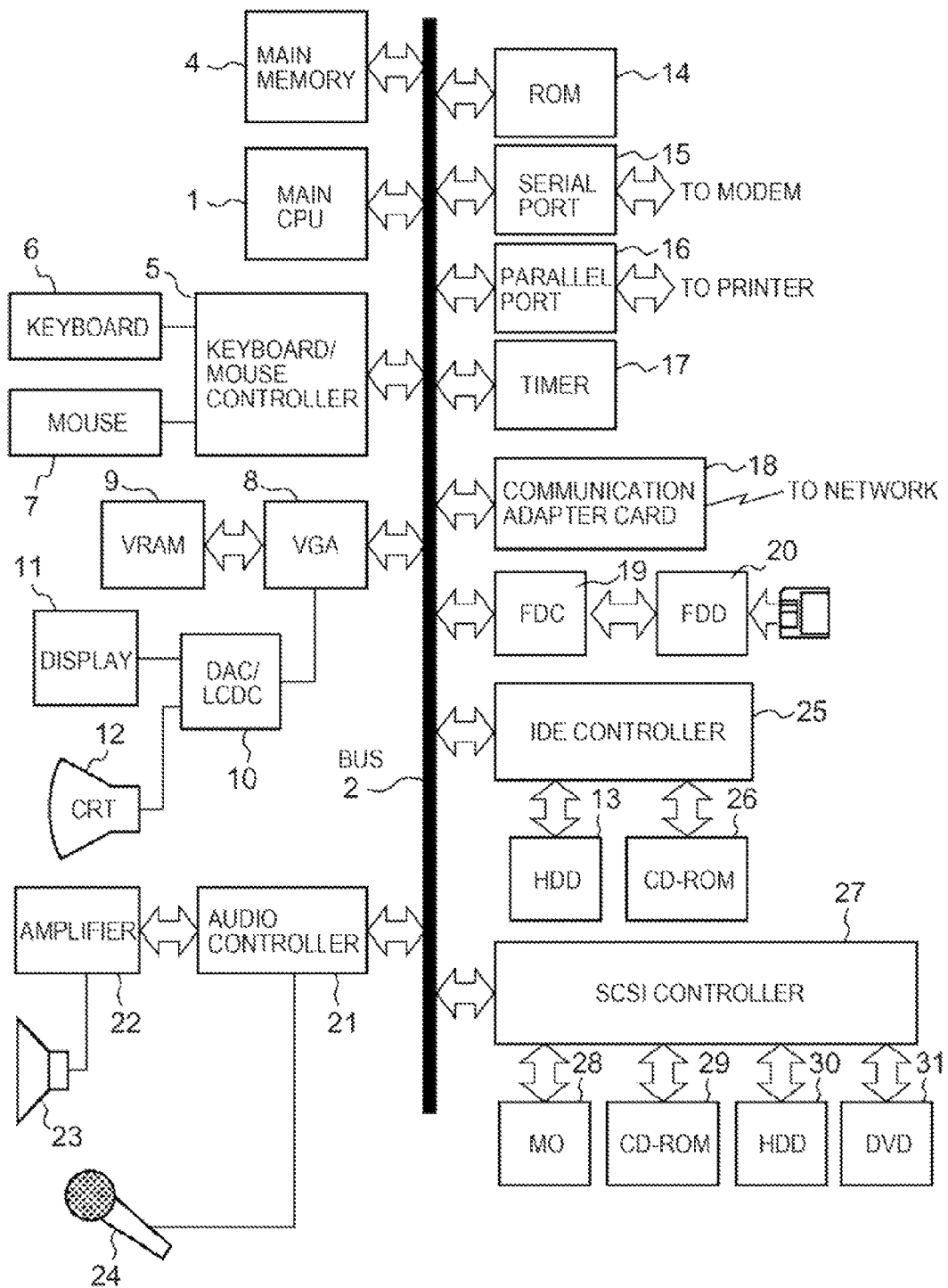
FIG. 9 shows an example of a hardware configuration of an information processing apparatus suitable for realizing the system according to the embodiment of the present invention.

FIG. 9 shows an example of the hardware configuration of the information processing apparatus suitable for realizing the service requester 115, the message hub apparatus 120, and the service provider 130 according to the embodiment of the present invention.

The information processing apparatus includes the CPU (central processing unit) 1 and the main memory 4 which are connected to a bus 2. A removable storage (an external storage system in which a storage medium can be exchanged), such as hard disk drive units 13, 30, CD-ROM drives 26, 29, a flexible disk drive 20, an MO drive 28, and a DVD drive 31 is connected to the bus 2 via a floppy disk controller 19, an IDE controller 25, a SCSI controller 27, or the like.

The storage medium, such as a flexible disk, an MO, a CD-ROM, and a DVD-ROM is inserted in the removable storage. These storage media, the hard disk drive units 13, 30, or the ROM 14 can store codes of a computer program for providing instructions to the CPU or the like cooperating with the operating system to carry out the present invention. The computer program is executed by being loaded to the main memory 4. The computer program can be compressed or divided into plurality to be stored in a plurality of media.

The information processing apparatus receives an input from a keyboard 6 or an input device such as a mouse 7 via a keyboard/mouse controller 5. The information processing apparatus is connected to a display device 11 via a DAC/LCDC 10 for presenting visual data to the user.

It is possible to connect the information processing apparatus to the network via a network adapter 18 (an Ethernet® card or a token ring card) or the like to communicate with other computers or the like. Although not shown in the drawing, it is also possible to connect it to a printer through a parallel port, or to a modem through a serial port.

From the above description, it can be readily understood that the information processing apparatus suitable for achieving the system according to the embodiment of the present invention is achieved by the information processing apparatus, such as a usual personal computer, a workstation, and a mainframe, or a combination thereof. However these components are illustrative and all of the components are not necessarily essential for the present invention.

It is apparent that various modifications can be readily conceived by those skilled in the art, such as combining a plurality of machines and distributing functions to them for implementing the respective hardware components of the information processing apparatus used in the embodiment of the present invention. These changes are naturally in the concept included in the thought of the present invention.

The system according to the embodiment of the present invention can employ the operating system which supports a GUI (Graphical User Interface) multiwindow environment, such as Windows® operating system provided by Microsoft Corporation, Mac OS® provided by Apple Computer Incorporated, or the UNIX® system provided with the X Window System (for example, AIX® provided by International Business Machines Corporation).

As mentioned above, it will be understood that the system used in the embodiment of the present invention is not limited to a specific operating system environment, Namely, any operating systems may be used as far as application software or the like can provide a resource management function for allowing the resources of the data processing system to be used. Incidentally, while the resource management function can include a hardware resource management function, a file handle function, a spool function, a job management function, a memory protection function, a virtual-memory management function, or the like, detail description of these functions is omitted since they are well known to those skilled in the art.

The present invention can also be achieved as hardware, software, or a combination of the hardware and the software. In an execution using the combination of the hardware and software, an illustrative example includes the execution in the data processing system having a predetermined program. In this case, by the predetermined program being loaded to the data processing system and executed, the program controls the data processing system and performs the processing according to the present invention. This program is constituted of a group of instructions which can be expressed by arbitrary language, code, and notations. Such a group of instructions allows the system to execute a certain function directly or after either or both of (1) conversion to a different language, code, or notation, and (2) duplication to a different medium are executed.

The present invention apparently includes not only such a program itself but also the medium which stores the program in its scope. The program for performing the function of the present invention can be stored in any computer-readable recording media such as a flexible disk, MO, CD-ROM, DVD, hard disk device, ROM, MRAM, RAM or the like. The program can be downloaded from other data processing systems connected though communication lines, or reproduced from other storage media for the storage in the storage medium. The program product can also be compressed or divided into plurality to be stored in a single storage medium or multiple storage media. In addition, it should be noted that the program product for carrying out the present invention could be apparently provided in various forms as well.

It is apparent to those skilled in the art that various modifications or improvements can be made to the embodiments described above. It should be noted that the mode to which such a modification or improvement is added is also included in the technical scope of the present invention.

The invention claimed is:

1. A message hub apparatus comprising:
a message storage unit for storing a received service processing message received from a service requester;
a timer for measuring the time that each service processing message has resided in the message storage unit;
a first storage unit for storing a minimum residence time during which the service processing message is to reside in the message storage unit;
a message transmission unit for transmitting the received service processing message present in the message storage unit to a service provider, in response to the minimum residence time having elapsed;
a search unit for searching, in response to receiving the received service processing message from the service requester, a mergeable service processing message present in the message storage unit which is mergeable with the received service processing message;
a message merge unit for merging the received service processing message and the mergeable service processing message, in response to the mergeable service processing message having been searched;
a second storage unit for storing a history of the merge processing by the message merge unit; and
a control unit for determining an optimum value of the minimum residence time by performing a statistical analysis of the history of the merge processing stored in the second storage unit to determine the optimum value as being an optimum of a sum of an amount saved and a cost associated with the merge processing, and for modifying the value of the minimum residence time stored in the first storage unit to the determined optimum value.

2. The message hub apparatus according to claim 1, wherein the message storage unit is a message queue having a queue structure, and wherein each service processing message invokes a programmatic action related to a business process implemented by a service provider in accordance with standards of a service oriented architecture that provides the business process as a service responsive to the service processing message.

3. The message hub apparatus according to claim 1, wherein the second storage unit stores a time that the mergeable service processing message has resided in the message storage unit until it is merged.

4. The message hub apparatus according to claim 1, further comprising a merge table for defining content of the merge processing, wherein the message merge unit performs the merge processing of the received service processing message and the mergeable service processing message based on the content in the merge table.

5. The message hub apparatus according to claim 1, wherein the message storage unit temporarily stores service processing messages before they are transferred to a service provider of a service oriented architecture, wherein each of the service processing messages cause services provided by the service provider to be executed or halted.

6. The message hub apparatus according to claim 1, wherein the merge table defines at least cancellation of the received service processing message upon a determination that an equivalent service processing message already resides in the message storage unit.

7. The message hub apparatus according to claim 1, further comprising a charge processing unit for calculating a difference between a charge for the received service processing message received from the service requester and a charge for the mergeable service processing message as transmitted to the service provider.

8. The message hub apparatus according to claim 7, wherein the charge processing unit calculates a difference between a required amount of a computer resource for the received service processing message received from the service requester and a required amount of the computer resource for the mergeable service processing message transmitted to the service provider.

9. A computer-implementable method of queuing a received service processing message in a message hub apparatus provided with a memory storage unit, wherein the message hub apparatus stores a value of minimum residence time during which the received service processing message is to reside in the memory storage unit, the method comprising the steps of:
receiving the received service processing message;
searching for a mergeable service processing message present in the memory storage unit, which is mergeable with the received service processing message, in response to receiving the received service processing message;
merging the received service processing message and the mergeable service processing message, in response to the mergeable service processing message having been searched;
storing the merge history of the merge processing of the received service processing message and the mergeable service processing message in the memory storage unit;

measuring the residence time of the service processing message in a message storage unit;

in response to the minimum residence time having elapsed, transmitting the received service processing message present in the message storage unit to a service provider; and determining an optimum value of the minimum residence time by performing a statistical analysis of the merge history stored in the memory storage unit to determine the optimum value as being an optimum of a sum of an amount saved and a cost associated with the merge processing, and modifying the value of the minimum residence time to the optimum value.

10. The method of claim 9, wherein the received service process message is received in a message queue having a queue structure, and wherein each service processing message explicitly activates a business process implemented by a service provider in accordance with standards of a service oriented architecture that provides the business process as a service responsive to the service processing message.

11. The method of claim 9, further comprising storing the time the mergeable service processing message has been stored in the memory storage unit until it is merged.

12. The method of claim 9, wherein the step of merging the received service processing message occurs upon a determination that an equivalent service processing message already resides in the message storage unit.

13. The method of claim 9, wherein the message storage unit is for temporarily storing service processing messages before they are transferred to a service provider of a service oriented architecture, wherein each of the service processing messages cause services provided by the service provider to be executed or halted.

14. The method of claim 9, wherein a merge table defines at least cancellation and compensation of the received service processing message.

15. The method of claim 9, further comprising calculating a difference between a charge for the received service processing message and a charge for the mergeable service processing message as transmitted to the service provider.

16. The method of claim 15, further comprising calculating a difference between a required amount of a computer resource for the received service processing message as received from the service requester and a required amount of the computer resource for the mergeable service processing message as transmitted to the service provider.

17. A non-transitory storage medium embodying computer program code for queuing a received service processing message in a message hub apparatus provided with a memory storage unit, wherein the message hub apparatus stores a value of minimum residence time during which the received service processing message is to reside in the memory storage unit, the computer program code comprising computer executable instructions configured for:

receiving the received service processing message;

searching for a mergeable service processing message present in the memory storage unit, which is mergeable with the received service processing message, in response to receiving the received service processing message;

merging the received service processing message and the mergeable service processing message, in response to the mergeable service processing message having been searched;

storing the merge history of the merge processing of the received service processing message and the mergeable service processing message in the memory storage unit;

measuring the residence time of the service processing message in a message storage unit;

in response to the minimum residence time having elapsed, transmitting the received service processing message present in the message storage unit to a service provider; and determining an optimum value of the minimum residence time by performing a statistical analysis of the merge history stored in the memory storage unit to determine the optimum value as being an optimum of a sum of an amount saved and a cost associated with the merge processing, and modifying the value of the minimum residence time to the optimum value.

18. The non-transitory storage medium of claim 17, wherein each service processing message invokes a programmatic action related to a business process implemented by a service provider in accordance with standards of a service oriented architecture that provides the business process as a service responsive to the service processing message.

19. The non-transitory storage medium of claim 17, wherein the embodied computer program code further comprises computer executable instructions configured for storing the time the mergeable service processing message has been stored in the memory storage unit until it is merged, and wherein the message storage unit is for temporarily storing service processing messages before they are transferred to a service provider of a service oriented architecture, wherein each of the service processing messages cause services provided by the service provider to be executed or halted.

20. The non-transitory storage medium of claim 17, wherein the embodied computer program code further comprises computer executable instructions configured for merging the received service processing message and the mergeable service processing message based on the content of a merge table.

* * * * *